July 29, 1958

Q. C. JOHNSON 2,845,004

ROCKET LAUNCHING SYSTEM

Filed July 7, 1954

INVENTOR.
QUINTON C. JOHNSON
BY
ATTORNEYS

July 29, 1958 Q. C. JOHNSON 2,845,004
ROCKET LAUNCHING SYSTEM
Filed July 7, 1954 6 Sheets-Sheet 4

INVENTOR.
QUINTON C. JOHNSON
ATTORNEYS

July 29, 1958 Q. C. JOHNSON 2,845,004
ROCKET LAUNCHING SYSTEM
Filed July 7, 1954 6 Sheets-Sheet 6

INVENTOR.
QUINTON C. JOHNSON
BY
ATTORNEYS

United States Patent Office 2,845,004
Patented July 29, 1958

2,845,004

ROCKET LAUNCHING SYSTEM

Quinton C. Johnson, Torrance, Calif., assignor to the United States of America as represented by the Secretary of the Air Force Application July 7, 1954, Serial No. 441,963

8 Claims. (Cl. 89—1.7)

This invention relates to a novel rocket launching system and installation of a nature defining a distinct advance over the systems disclosed by the prior art. The novel installation comprises a series of rocket launching units arranged in tandem which are fully retractable within a relatively small space through the bomb bay doors of an aircraft and in a novel arrangement sequentially and automatically extensible through the bomb bay doors for predetermined firing sequence. Moreover, the mechanism of the novel system incorporates means providing novel safety features whereby a succeeding launching unit cannot be extended until the preceding unit is cleared of rockets and fully retracted. Thus, the improved rocket launching apparatus which is the subject of this invention provides both a space saving arrangement and novel safety features for protection of the passengers of the aircraft while providing a novel association of the rocket launching units to present increased fire power. In addition, the launching units, per se, of the invention are improved in nature to provide a more positive acting structure in the extension and retraction thereof and incorporate a novel jettison device to clear each launching unit at a predetermined time.

Accordingly a continuous and automatic sequential firing of a large number of rockets from an aircraft is enabled by the invention by an automatically acting series of successively extensible and retractable rocket launching units of a compact nature.

An object of the invention is to provide a novel and improved rocket launcher installation employing a series of rocket launching units in tandem wherein the units are successively automatically and sequentially extensible and retractable.

Another object of the invention is to provide a novel compact rocket launching unit which is fully retractable within the bomb bay of an aircraft.

A further object of the invention is to provide a novel rocket launching installation employing a series of successively automatically and sequentially extensible and retractable rocket launching units incorporating a novel safety arrangement whereby a succeeding launching unit may not be extended until the preceding unit has been cleared and fully retracted.

An additional object of the invention is to provide a novel rocket launching unit of an improved nature incorporating an improved suspension structure.

Another object of the invention is to provide an improved extensible and retractable rocket launching unit including a novel jettison control whereby retraction thereof may be prevented until the unit is cleared.

Other objects and advantages of the invention will be readily apparent to those versed in the art from the following description taken in conjunction with the accompanying drawings wherein.

Figure 1:
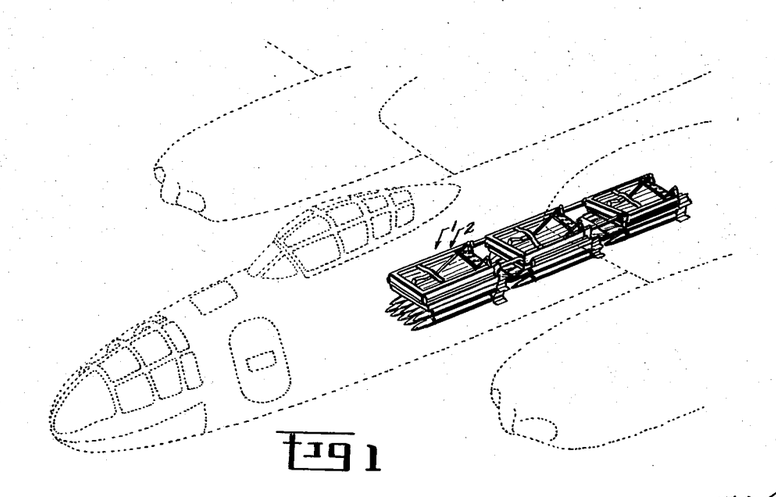
Fig. 1 shows in perspective the novel rocket launcher installation employing a series of novel rocket launching units arranged in tandem and in retracted position in an aircraft.
Figure 2:
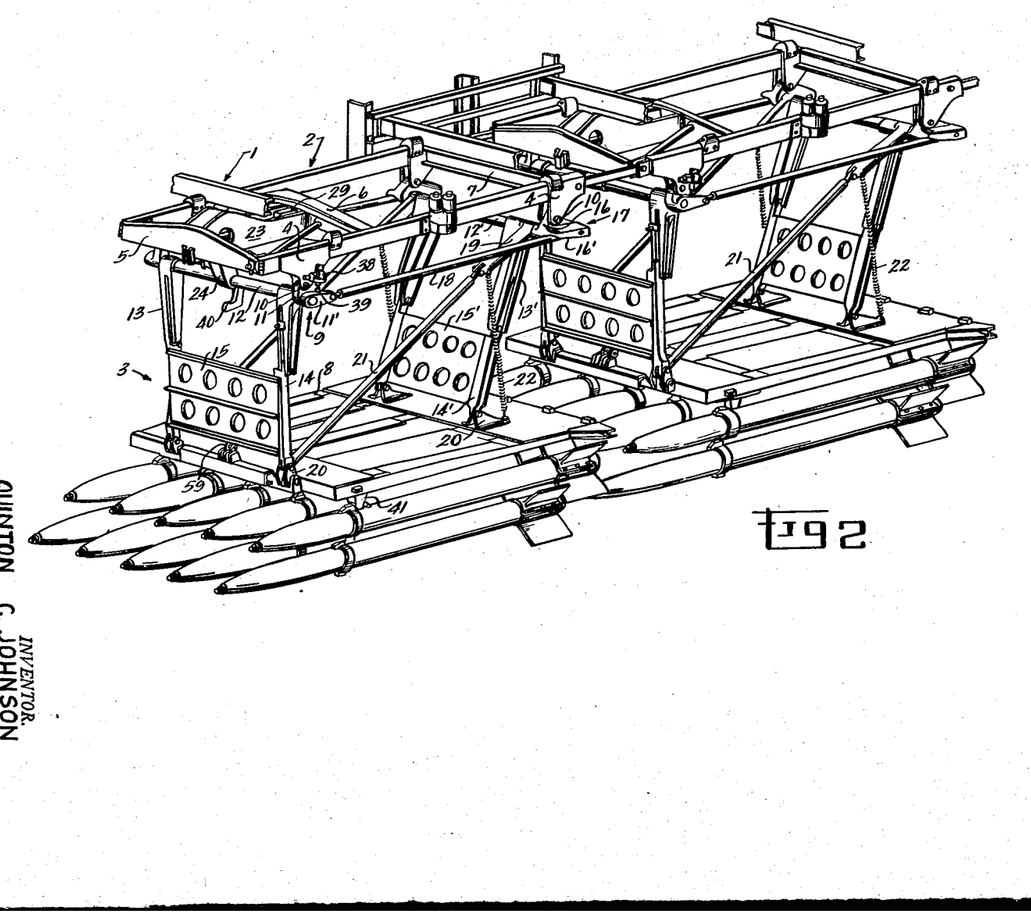
Fig. 2 is a perspective view of the improved rocket launching unit in extended position.

Referring to Fig. 2 of the drawings the improved rocket launching unit comprises a rail assembly 1 arranged within the bomb bay of an aircraft. Rectangular support frames 2 bolted to the rail assembly 1 provide support for the individual launcher units 3. Brackets 4 composed of spaced plates welded to and depending from each rectangular support at the forward and rear portions thereof, as shown in Fig. 2 of the drawings, serve to pivotally support the launcher suspension structure. Transverse bar members 5, 6, and 7 connect the parallel bars of each rectangular support from front to rear. Supporting linkage pivotally connected to the respective brackets 4 support a rocket launching platform 8 in depending relation. The linkage at the forward portion of each unit consists of bell crank levers 9 pivotally mounted on bolts 10 connecting the spaced plates of the brackets 4 by one arm 11. Connecting the respective forward bell crank levers 9 transversely is a torque tube 12 to which the levers 9 are fixed for rotation therewith. Adjacent the bell crank levers to the inner sides thereof are upper suspension links 13 securely mounted on the torque tube 12 at the upper ends thereof and bifurcated at the lower ends. Lower link members 14 extending within the bifurcated portions of links 13 are pivotally connected to the respective upper links by bolt members and transversely joined by brace plates 15.

Similarly transversely aligned at the rear of the rectangular support 2 and pivotally connected to brackets 4 by bolts 10 are bell crank levers 17 connected by and fixed to a transverse torque tube 12'. Spaced inwardly from the respective bell crank levers 17 and securely connected to the torque tube 12' are upper links 13' having bifurcated depending portions to which bifurcated portions are pivotally connected lower link members 14' interconnected by reinforcing plates 15'. The bell crank levers 9 and 17 are jointed by tie rods 18 pivotally connected to arms 11' and 16' of the levers 9 and 17 respectively. Auxiliary arms 19 depend in a forward direction from the rear torque tube and are secured thereto intermediate the links 13' and bell crank levers 17. The lower links forward and rear are pivotally connected to brackets 20 connected to the upper surface of the rocket launching platform 8. Diagonal tubular brace members 21 pivotally connected to the auxiliary arms 19 at their upper ends are pivotally connected to the forward brackets 20 at their forward ends. Spring members 22 are respectively connected at their ends to rear brackets 20 and auxiliary arms 19.

Interconnecting the transverse bar members 5 and 6 are longitudinal parallel plates 23. A lever arm 24 is secured to torque tube 12 and extends upwards to a substantially triangular link member 25 and is pivotally connected thereto at 26. Also pivotally connected at 27 to the rear of link member 25 is a piston 28 extending from an actuating cylinder 29. Pivotally connected to he upper portion of link 25 is an upper bifurcated guide link 30 which is pivotally connected to the plates 23 at a point 31 by a bolt member. Mounted on the inner surface of plate 23 is upper position link stop 32. Also connected to the plates 23 adjacent the link stop is a microswitch 33. The link member 25 and the upper guide link 30 each have projections 34 and 35 thereon respectively which are located at the forward portions thereof. These projections are connected by a spring member 36. Mounted on the transverse bar 5 in the path of link 25 is a microswitch 37. Also on the front bracket 4 as shown in Fig. 2 is a microswitch 38 for cooperation with a projecting lug 39 on bell crank member 9. Connected with the link 24 on torque tube 12 is a retaining hook 40.

On the underside of rocket carrying platform 8 and depending therefrom are rocket carrying brackets 41 transversely aligned at the forward portion thereof. The brackets have depending bifurcated portions and to each of the brackets are pivoted catch portions 42 arranged with a hook portion at the lower end to engage the mounting bracket of a rocket. Each unit platform is arranged to carry ten rockets in two banks, the lower bank being suspended from the upper bank in suitable fashion as indicated in the drawings. The arrangement for arming and firing of the rockets themselves not being pertinent to the invention will not be described.

Figure 5:
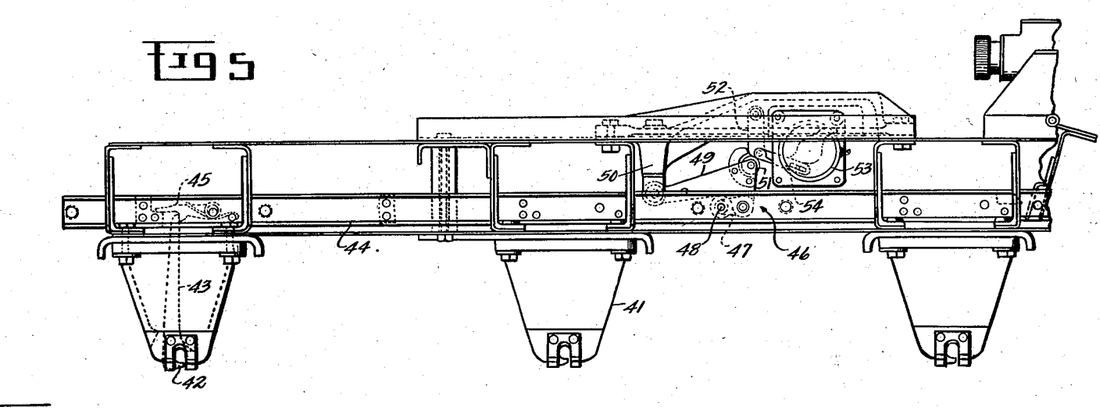
Fig. 5 is a partial detail showing of the jettison device of the improved launching unit.
Figure 5A:
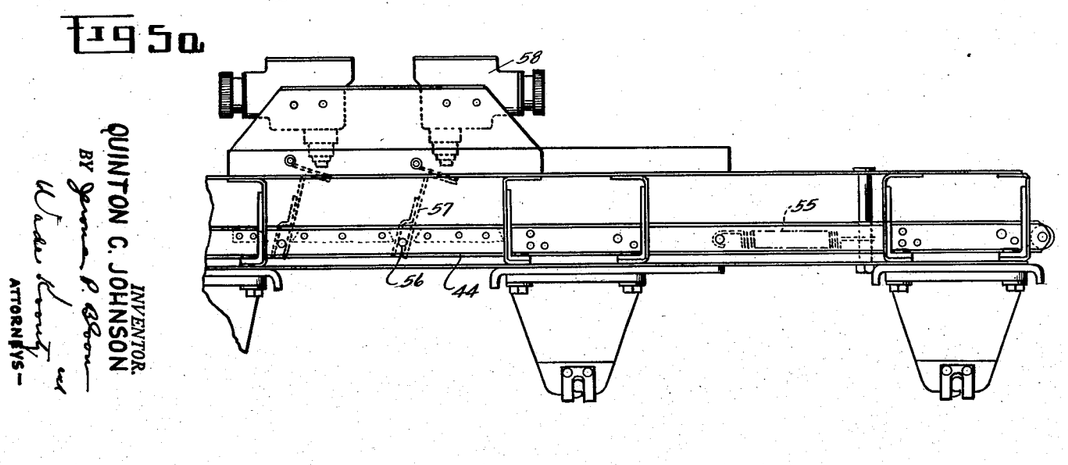
Fig. 5a is an additional partial detail showing of the jettison apparatus of the launching unit to be taken in conjunction with Fig. 5.

The catch portions 42 have upwardly extending arms 43 when in the locked position. In a recess extending transversely of the rocket launching platform is located a jettison bar 44 which carries in equally spaced fashion a series of spring-loaded latch members 45, each arranged to engage on arm 43 of the catch members or support hooks when the bar is moved to the cocked position manually securing the rockets to the platform.

The jettison bar is held in cocked position by a toggle linkage 46 connected to the rocket launching platform. This toggle linkage consists of a short arm 47 pivotally connected at 48 to the jettison bar and a longer arm 49 pivotally connected to the short arm and to a bracket 50 on the platform. A roller 51 on the arm 49 is engaged by a keeper element 52 when cocked which keeper is pivoted to the platform to prevent upward displacement of the toggle linkage when in the cocked position. A rotary solenoid 53 mounted on the platform adjacent the toggle linkage has a link 54 therefrom connected to the keeper which link 54 is adapted to move the keeper out of engagement with the roller member on energization of the solenoid. The jettison bar is initially manually cocked and after all the rockets are fired the final impulse transmitted energizes the rotary solenoid to move the keeper out of engagement with the roller member. A spring 55 connected at one end to the jettison bar and at the other end to the platform stores energy on cocking of the bar so that on release by the keeper the bar is moved to a tripped position by the spring.

Pins 56 are located on the jettison bar to cooperate with links 57 pivoted on the platform and engaging the pins. Microswitches 58 are mounted on the platform adjacent each link. On tripping of the jettison bar the links engage and trip the switches 58 to actuate piston 28 to retract the platform.

Also mounted on the front end of the launching platform is a retaining bracket 59 for cooperation with the retaining hook 40 on link member 24 to retain the launcher platform in retracted position upon retraction thereof.

Figure 4:
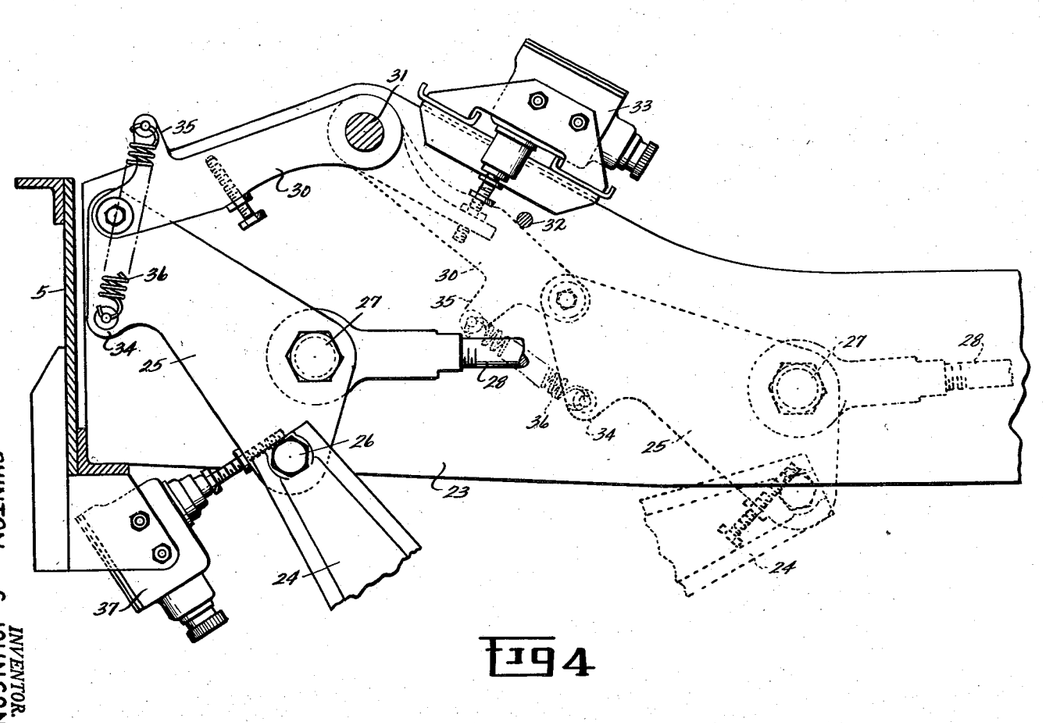
Fig. 4 is a partial detail showing of the overcenter lock device employed in the launching unit.

In the extended position of a launcher unit as shown in Fig. 2 of the drawings, the piston 28 is in its forward position, the forward movement of member 25 having rotated the torque tube 12 through link 24 at its lower end and the link 25 having rotated the link 30 to its uppermost position. The spring 36 provides a force to retain the arm 30 against the stop 32 with the launcher unit in retracted position (the dotted line position of Fig. 4). Thus, the spring provides an up lock in the event that the hydraulic pressure in the cylinder 28 is released.

As the torque tube 12 is rotated, of course, the links 13 and bell crank levers 9 are rotated, the connecting members 18 simultaneously causing rotation of rear torque tube 12' and connected links 13' and 19, and bell crank levers 17. The movement of members 13 and 13' extends links 14, 14', and accordingly the rocket platform, the members 19 and 21 serving to brace and retain the rocket platform when in its fully extended position, being biased by springs 22 to their bracing position. Upon power application to piston 28 to draw link member 25 rearwardly torque tubes 12 and, as is obvious, 12' are rotated, rotating arms 19 to break the brace 21, 19 and by connecting links 13, 14 and 13', 14' retracting the platform 8, the over-center lock mechanism 25—36 having been released by power through piston 28 in a manner which is readily apparent from Fig. 4 of the drawings.

Figure 3:
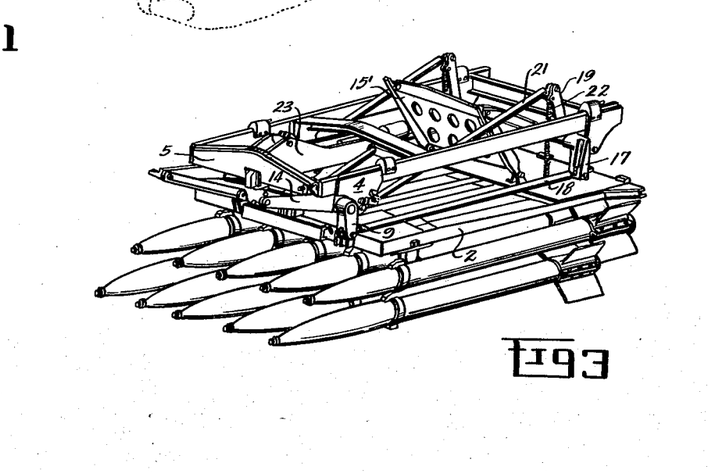
Fig. 3 shows in perspective a single launcher unit in retracted position.

On full retraction the suspension linkage assumes the relative position shown in Fig. 3, the retaining hook 40 engaging bracket 59 to retain the platform in retracted position till power is actuated.

The novel suspension structure as can be readily seen is simple yet positive in character folding compactly yet freely so that projection is smooth and requires a minimum of effort, the positioning in its limit positions being such that power is necessary to effect movement therefrom.

Figure 6:
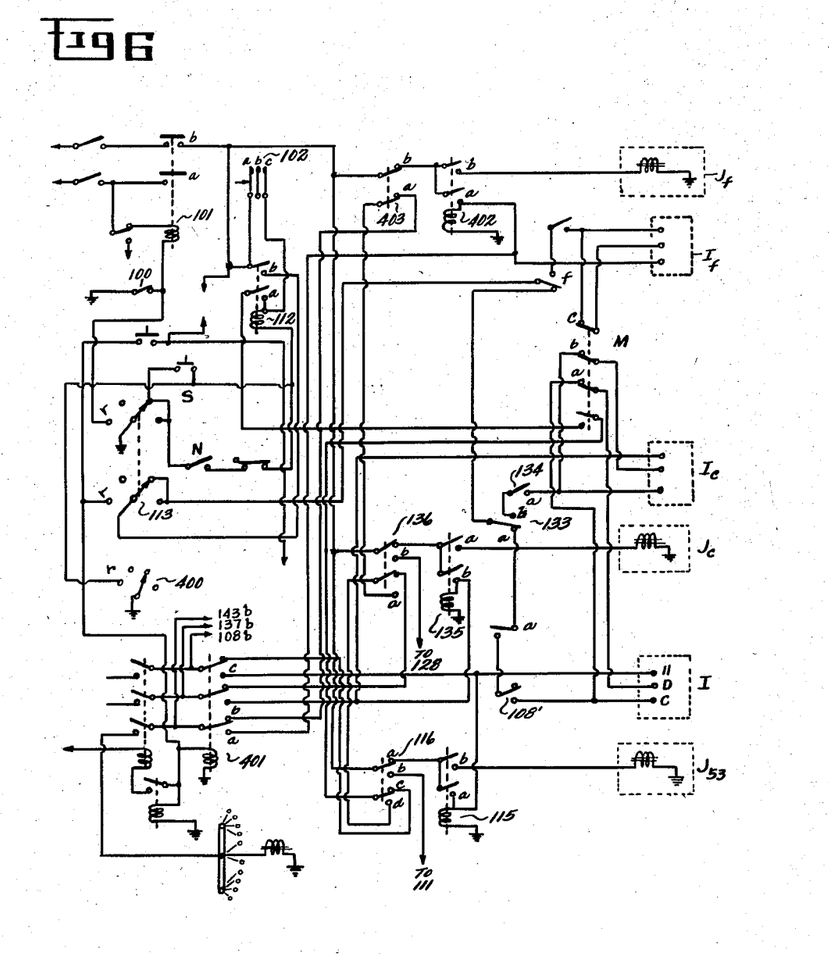
Figs. 6 and 6a are schematic showings of the relationship of the control switches involved in the automatic sequential extension and retraction of the rocket launching units.
Figure 6A:
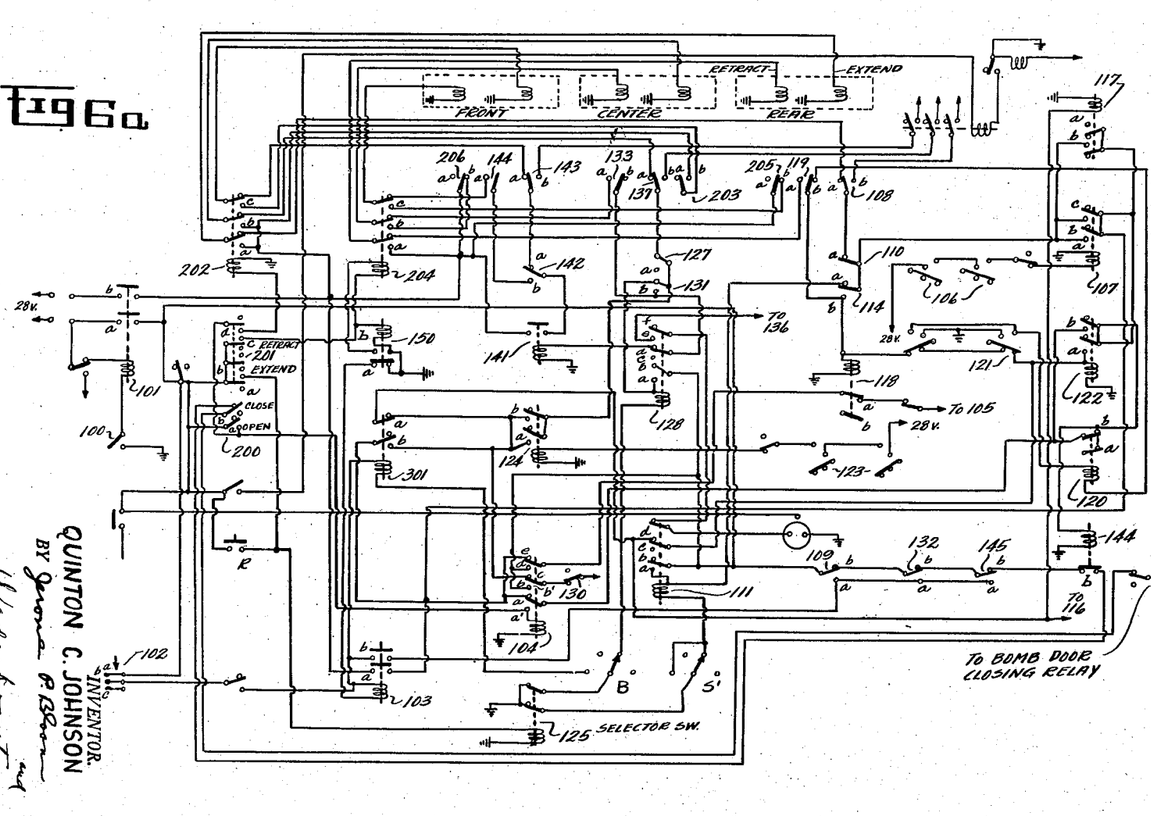

The novel control system of the invention can be readily seen from the schematic showing in the drawings. Since this invention is specific to the arrangement of a series of rocket projector interrelated for sequential raising and lowering thereof with safety controls therefor, the discussion of the circuit will be limited to the extension of a rocket platform and the raising thereof before a succeeding one is extended with no reference to the firing system since it form no part of the present invention With reference to the drawings, the operation of the novel automatic sequence system of applicant's invention proceeds as follows. The master switch 100 is closed energizing relay 101. This closes contacts 101a and 101b, completing a circuit from power upon depression of pilot control switch 102 into a first contact position between contacts 102a and 102b, through 101a, 102a, 102b, coil of relay 103 through contact 150a to ground to energize relay 103 closing contacts 103a and 103b. This completes a circuit from power through 101b, 103a, 104a, 120b, solenoid coil 144 to ground to energize the solenoid coil 144 to open the bomb door closing circuit. As this circuit is opened at solenoid 144, an effective delivery of power is made to rear bomb door opening relay 105 from 104a, 104e, and 118a. Thus the rear bomb doors open and upon full opening switches 106 are actuated to energize the coil of relay 107 closing contacts 107a and 107b. As contact 107a is closed a circuit is established to direct power from 103a, through 107a, microswitches 110a and 108a to energize the rear launcher control valve to extend the rear launcher.

As the rear launcher begins to extend the microswitch 109 goes to its inactivated position 109a. As power is directed to extend the launcher, power from 107a is directed through microswitch 114a through the coil of relay 111 and the firing sequence control S' to ground to energize relay 111 to disengage and break the circuit to the center launcher system to prevent the extension of the center launcher until the rear launcher has been emptied and fully retracted. The power through 101a is then directly connected through 109a and the coil of relay 103 to ground to form a holding circuit to keep relay 103 energized. Similarly the power from 101a is directed through 111a, to the coil of relay 111 to ground to act as a holding circuit to keep relay 111 energized until the center launcher rockets are to be fired.

At this point, with the mode selector switch on "train," the pilot switch 102 is depressed to its firing position 102c to establish a circuit from power through the coil of relay 112, the closed nose gear switch N, the firing control switch S to ground to energize relay 112 closing contacts 112a and 112b. This provides power through 112b, firing control switch 113, forward launcher microswitch f, center launcher microswitch 133, aft launcher microswitch a, and microswitch 108' closed only when the rear launcher is extended. Thus though contacts 102a, b, and c be made simultaneously, no power will be delivered to the fire control unit I until the aft launcher is extended and switch 108' closes to direct power to contact C of control unit I. The control unit I is connected to the mode switch through contacts Ma thereof so that the rockets will be set off in turn by the impulses from the control unit I in timed relation. After the impulses from the control unit I are delivered, an eleventh impulse is delivered from $I_{11}$ through the coil of relay 115 to ground to energize relay 115 closing 115a and 115b. This provides power from 101b through 116a, 115b to jettison solenoid $J_{53}$ shown as 53 in Fig. 5 to trip the jettison bar 44 and clear the rear launcher. Upon clearance switch 116 is actuated to 116b position to deliver power from 101b through 116b to energize relay 117 closing contacts 117a and 117b. On the aft launcher being cleared switch 114 is actuated to open 114a, closing 114b to carry power through 117b, 114b, 119a to energize the rear control valve to retract the launcher.

Upon full retraction, switch 119 opens 119a and closes 119b to deliver power to energize the coil of relay 120 connecting to ground through switch 121. This opens 120b to deenergize solenoid 144 to permit the rear bomb door to close, the relay 118 having been energized through connection to 114b and ground, on the rear launcher being cleared, to open the circuit to the rear bomb door opening relay 105. Upon the rear launcher being fully retracted 109b is automatically closed to provide power through 109b, 144b to the door closing relay.

Depressing switch R breaks the holding circuit through relay 111 by energizing relay 125 in a manner which is obvious. Thereupon power from 114b is directed through switches 121 to energize the coil of relay 122 closing 122a and 122b to complete a circuit through 120b, solenoid 144 to ground to energize solenoid 144 and open the door closing circuit, permitting power through 111d to energize front bomb door opening relay 130. As the front bomb doors are fully open switches 123 close to complete a circuit from power through the coil of relay 124 to ground. This energizes relay 124 to close 124a and 124b to deliver power from 111d through 124b, switch 127 and 137a to the center launcher extension control valve and from 124b, 131a, the coil of relay 128, firing control switch B to ground to energize relay 128 and open the circuit providing power through relay 141 to the front launcher through relay 128. On full extension of the center launcher unit, switch 132 closes its 132a contact to again provide a holding circuit for relay 103. A holding circuit for relay 128 is provided from 101a, 128a, the coil of relay 128 to ground. Then power through depressing switch 102 to firing position 102c as in the rear launcher system provides power through 113, f, 133b and 134a (made when the center launcher is fully extended) to Ic. The train control is made for Ic through Mb and the rockets are fired in train by Ic and the eleventh impulse energizes relay 135 closing 135a to provide power therethrough from 101b to jettison solenoid Jc for the center launcher to trip the jettison bar and clear the launcher. Upon clearance 136b is closed and a circuit is completed to ground through relays 128 and 111. The switch 131b is closed when the center launcher is empty. This provides power through 131b, 133a, to the center launcher retracting valve to retract the center launcher. On full retraction the switch contact 132b is made. Operating switch R to energize relay 125 again breaks the hold circuit, in this case the power to relay 128, to permit power to be directed through 131b, 128d, coil 141 to ground to energize solenoid 141 closing its contacts to provide a circuit from 101b through 141a, 142a, 143a to the front launcher control valve to extend the launcher. The forward launcher rockets are fired in a manner similar to the other rockets and the launcher is cleared again in a manner which is obvious and has been described with reference to the rear and center launchers. As the launcher is cleared, 142b is made to complete a circuit through 144a to retract the forward launcher. This closes switch contact 145b breaking the hold circuit of relay 103 to deenergize relay 122 releasing solenoid 144 to complete closing of doors.

*Manual control*

To manually retract and extend the launchers when desired or necessary, the circuits are as follows. With the master switch 100 closed relay 101 is energized. Then switches 200 are moved to an open position to close the circuit to open the bomb doors and switches 201 are moved to an extend position to extend the launchers as follows. From power through 101a, 200a a circuit is completed through the coil of relay 104 to ground, the relay 104 being the manual bomb door open control. The relay 104 is thus energized. This closes 104a', 104b and 104d. Prior to the opening of the doors a circuit through 200a, 104a', 120b, coil of relay 144 to ground, energizes relay 144 to open the door close circuit. Then a circuit is completed from power through 101a, 104d, 118a, to the rear door relay 105 to open the rear bomb doors. At the same time a circuit is completed from 101a to 104b, relay 130, to open the front bomb doors.

Power through 101a, 200a, 201d, coil of relay 202 to ground energizes the manual extension relay 202 to close contacts 202a, 202b and 202c. Then from power through 101b, 202a to the coil of the relay of the rear control valve to ground energizes the rear control relay to extend the aft launcher.

At the same time similarly a circuit is completed through 202a, 202b, the center launcher extension relay to ground to extend the center launcher. On full extension of the center launcher the switch contact 203b is closed to provide power from 202b, 203b, 202c to the forward launcher extension relay to extend the forward launcher.

To retract the launchers, switches 201 are switched to a retract position. Then a circuit is completed from 101a, 201c, the coil of relay 150 to ground to energize relay 150 closing 150b. Thus power from 201c through the coil of retracting relay 204, 150b to ground completes a circuit to energize relay 204 closing 204a, 204b, and 204c. A circuit is completed from power through 101b, 204a to energize the rear launcher retracting relay and retract the rear launcher. On retraction of the rear launcher a circuit is completed from power through 101b, 205b, 204c to forward launcher retracting relay to retract the forward launcher. On retraction of the forward launcher 206b closes to provide a circuit from power 101b, 206b, 204c to the center launcher retracting relay to retract the center launcher.

The door switch 200 is then switched to a close position which opens the circuit to solenoid 144 permitting contacts 144b to close, completing a circuit from power 101a, through 109b, 132b, 145b, 144b, 200b, to a relay to close both bomb doors.

In the event that it is desired or necessary to jettison all rockets for any reason while in flight the following system is provided. With this jettison system the master switch may be by-passed. On placing the selector switch on "jettison ready" a circuit is completed from power through the jettison ready setting r on switch S, to ground to energize the relay 101. This provides a power circuit through 101a, 102a, 102b, relay 103, the coil of the jettison launcher interlock relay 301, through the jettison ready contact and arm of selector switch B to ground to energize the jettison interlock relay 301 as well as relay 103. This closes contacts 301a and 301b. The relay 103 having been energized, contacts 103a and 103b are also closed. Thus the holding circuit is established from 103a, 104a, 120b to the coil of relay 144 to ground to energize relay 144 and open contacts 144b to open the bomb door closing circuit. Similarly from 103a a circuit is completed through 104a, 104e, 118a to energize the rear bomb door opening relay 105 to open the rear bomb doors. At the same time a circuit is completed from 103a through 301b, to energize the front door opening relay 130 to open the front bomb doors. As the rear bomb doors are full open, switches 106 are closed energizing relay 107 to complete a circuit from 103a, 107a, 110, 108a to the rear launcher extension valve to extend the rear launcher and as the forward bomb doors are full open, switches 123 are closed to provide a circuit from power to ground through switches 123 to energize relay 124 to close contacts 124a and 124b. This completes a circuit from power through 103a, 301b, 124a, switches 131, 127, 137a to energize center launcher extension relay and extend the center launcher.

As the rear and center launchers are fully extended, switch contacts 108b and 137b are respectively closed.

As the pilot firing control switch is moved to close 102a, 102b and 102c a circuit is completed from power through 102a–c, the coil of relay 112, the jettison ready setting of switch 400 to ground to energize relay 112. This completes a circuit from power to 101b, 112b, the jettison ready contact r of switch 113 to energize relay 401 closing contacts 401a, 401b and 401c. Power from 108b is delivered through 401c, the coil of relay 115 to ground to energize the coil of relay 115 closing 115a and 115b. Then a circuit is completed through 101b and 116a, 115b to energize the rear jettison solenoid $J_{53}$ to jettison all rockets thereon. Likewise a circuit is completed through 137b, 401b, the coil of relay 135 to ground to energize relay 135 closing 135a and provide a circuit from power through 136b, 135a to the center jettison solenoid Jc to jettison all rockets on the center launcher.

As the center launcher is cleared switch contact 131b is closed to provide a circuit from power through 103a, 301b, 124b, 131b, 128d, coil of relay 141 to ground to energize relay 141 to close its contacts and complete a circuit from power through 101b, 141, 142a, 143a, 202 to the forward launcher extension relay to energize such relay and extend the forward launcher which closes switch 143b when fully extended. This completes a circuit from power through 143b, 401a, the coil of relay 402 to ground to energize relay 402 and close 402a and 402b. This completes a circuit from power, through 101b, 403b, 402b, and the forward jettison solenoid Jf to jettison all rockets on the forward launcher.

As each launcher is empty, the respective switch contacts 114b, 131b, and 142b are closed to direct power respectively, in order through 119a, 133a and 144a to the launcher retracting valves to retract the launchers. On retraction of the rear launchers the holding circuits are broken and the bomb doors close in a manner which is obvious.

The subject invention as can be readily seen presents a distinct advance in mechanism for enhancing the rocket fire power of aircraft with very little change in aircraft structure and employing a minimum of space with a maximum of safety. The many advantages and modifications of the invention within the scope and disclosure thereof will be readily apparent to those versed in the art.

I claim:

1. A rocket system for projecting rockets from a vehicle comprising a series of platforms, means connected to said platform for releasably mounting rockets thereon, separate control means for extending and retracting each of said platforms connected therewith, means operatively associated with each of said platforms, said rockets, and said control means to prevent retraction of a platform before all rockets are released therefrom, and means interconnecting said series of platforms and said control means to prevent projection of a succeeding platform until the previous platform has been retracted.

2. A rocket launching system for use in an aircraft comprising a series of rocket launcher platforms arranged in tandem having means mounting rockets thereon, jointed suspension means interconnecting each of said platforms and the aircraft, power control means operatively connected to each suspension means to extend and retract said platforms, means operatively interconnecting said platforms to normally prevent the extension of more than one platform at a time, jettison control means mounted in each of said platforms in operative relation to the rocket mounting means, and means operable to prevent the retraction of a rocket platform until actuation of said jettison control means.

3. A rocket launching system comprising a series of rocket launching platforms arranged in tandem, a support means, means pivotally connecting said support means and each of said platforms, power control means for each of said platforms operatively interconnected and each operably connected to one of said connecting means adapted for extension and retraction of a platform, means to actuate one of said power control means to extend one platform, and means operable upon extension of said one platform to prevent the extension of a succeeding platform until said one platform is fully retracted.

4. The structure as set forth in claim 3 and clearing means connected to said platform operable to clear said rocket platform after firing of rockets therefrom, said clearing means being operable on actuation thereof to complete a circuit to the power control means to initiate retraction of a platform.

5. A rocket launching system comprising a series of rocket mounting platforms arranged in tandem, support means, means connecting said platforms to said support means, control means connected to each of said connecting means operable to extend said platforms in predetermined sequence, means operatively connecting said platform and said control means to interrupt said control means on full extension of one of said platforms, means mounted on said platform in operable relation to rockets mounted thereon operable to jettison such rockets, means operatively associated with said jettison means effective to prevent retraction of said platform till the platform is cleared, and means operable on full retraction of a platform to initiate the extension of a succeeding platform.

6. A rocket launching system for an aircraft comprising a series of rocket mounting platforms arranged in tandem, suspension means interconnecting each of said platforms and the aircraft, control means connected to each platform for extension and retraction thereof and operatively interconnected to normally prevent extension of more than one platform at a time, means mounted on said platforms for releasably connecting rockets thereto, a jettison bar in each platform operatively engaging said means for connecting rockets thereto, holding means connected to said platform and engaging said jettison bar to prevent jettison of the rockets, and further means mounted on each platform in operative association with the jettison bar actuable by said jettison bar on release of said holding means to initiate retraction of the platform.

7. A rocket launching system comprising a series of extensible rocket launching platforms normally in retracted position, means connected with the first of said series of platforms for extension thereof, limit means to limit the extension of said first platform, means associated with said platform for firing the rockets mounted thereon, means mounted on said platform for clearing the platform upon interruption of firing rockets therefrom, control means responsive to the clearing of the platform for retracting said platform, and switch means responsive to the complete retraction of said platform to energize the succeeding platform for extension thereof.

8. A rocket launching system comprising a series of extensible platforms mounting rockets and normally held in retracted position, means operatively connected with said platforms for extending the first of said platforms, means operable on complete extension of said platforms to fire the rockets thereon, jettison means operative to clear the platform upon completion of rocket firing, normally open circuits responsive to the clearing of the platform to close to retract said platform, and means responsive to the complete retraction of said platform to initiate the extension of the succeeding platform.

References Cited in the file of this patent

UNITED STATES PATENTS

| | | |
|---|---|---|
| 2,409,210 | Jolly | Oct. 15, 1946 |
| 2,440,723 | Macdonald | May 4, 1948 |
| 2,481,542 | Schuyler | Sept. 13, 1949 |
| 2,591,834 | Kuka | Apr. 8, 1952 |
| 2,709,947 | Woods | June 7, 1955 |